United States Patent Office 2,730,768
Patented Jan. 17, 1956

2,730,768
METHOD OF MANUFACTURING ELECTRICALLY CONDUCTIVE MEMBRANES AND THE LIKE

John Thacher Clarke, Newton Highlands, Mass., assignor to Ionics, Incorporated, Cambridge, Mass., a corporation of Massachusetts No Drawing. Application December 5, 1951, Serial No. 260,080

11 Claims. (Cl. 18—58)

This invention relates to a method of making electrically conductive, solid structures of predetermined dimensions and in particular to a method of making insoluble, electrolytically conductive, synthetic organic, ion exchange polymers.

Until recently, solid materials, particularly synthetic organic resins, having substantial ion exchange capacity were obtainable only in particulate form, such as granules or beads. The copending application of Walter Juda and Wayne A. McRae, Serial No. 103,784, filed July 9, 1949, now Patent No. 2,636,851, issued April 28, 1953, describes synthetic polymeric materials in the form of hydrous gels which may be formed into such large dimensioned structures as membranes, tubes, rods, vessels and the like. These materials, like ion exchange resins, include in their polymeric structure dissociable ionizable radicals, one ionic component of which is fixed into or retained by the polymeric matrix and at least one component of which consists of a mobile and replaceable ion electrostatically associated with the fixed component. The ability of the mobile ion to be replaced, under appropriate concentration conditions, by ions of the same charge, imparts ion exchange characteristics to these materials.

More important, however, is the effect the fixed radicals have on the electro-conductive properties of these materials. The fixed ions possess charges which attract ions of opposite charge and repel ions of like charge. Under the influence of an electric field, ions charged like the mobile ions may be caused to permeate the material exclusively of ions of the opposite charge, which are repelled. These materials are accordingly electrically conductive and selectively permeable. The above mentioned application of Juda and McRae describes a method of manufacture wherein the polymerizable ingredients are reacted to the final stage of polymerization which is to be effected while maintained in an aqueous solution under conditions preventive of evaporation of water. Here it was believed that the presence of water was effective in causing proper orientation of the ion exchange groups in dissociable position, by providing dissociable conditions during the polymerization and assuring that the ion exchange groups of the final polymer were dissociably retained. It has now been found that the polymerization may be carried out in the presence of organic solvents, and in the absence of water. The present inveniton comprises a method of manufacturing polymeric solid material of the general characteristics of those described by Juda and McRae and provides a method of manufacturing such materials wherein the polymerizable ingredients are reacted to the final stage of polymerization which is to be effected while maintained in solution in an organic solvent. By this means, polymerizations can be carried out which are inhibited or prevented in aqueous solution, and thereby electrically conductive structures may be manufactured by the present method which are not obtainable by the method described by Juda and McRae. Frequently, it also happens that the presence of water during the polymerization causes that reaction to proceed at a rate which is too rapid for the formation of homogeneous coherent structures. By the present invention, it is often possible to select an organic solvent for the polymerizable ingredients in which the polymerization proceeds at a more convenient rate. For instance, when resorcinol, a polyalkylene polyamine, and formaldehyde are caused to condense in water, it is necessary to acidify the solution to slow down the rate of polymerization. However, these ingredients may be reacted in a solution of methanol without acidification, and the polymerization proceeds at a desirably slow rate.

The materials which may be manufactured by the method of this invention are not only electrically conductive and selectively permeable but are also mechanically durable, so that they may be formed into self-sustaining structures and are substantially hydraulically impermeable under ordinary pressure differentials, so that they may be used effectively as hydraulic separators. These materials may be used in dialysis and electrodialysis apparatus where advantage may be taken of their selectively permeable and highly conductive properties. Several such arrangements are described in the above identified application of Juda and McRae.

This invention is concerned in general with the preparation of synthetic organic polymeric structures of extreme insolubility and which are in the form of solvated gels containing active ion exchange groups. Accordingly, the polymeric solvated structures are highly crosslinked, at least to the extent necessary to impart the required degree of insolubility and to prevent undue volume changes, often accompanied by disintegration, when contacted with other liquids. Generally, the extent of crosslinking for this purpose is obtained by using at least 20 mol per cent and up to 100 mol per cent of crosslinking compounds on the total mols of polymerizable compounds. Preferably the extent of crosslinking is from 30 to 65 mol per cent. In the appended claims, the term "a highly crosslinked polymeric matrix" is intended to mean polymeric structures obtained by the use of at least 20 mol per cent and up to 100 mol per cent of crosslinking compounds on the total of all polymeric compounds. Ion exchange groups are incorporated in the polymeric matrix either by utilizing polymerizable ingredients which include dissociable ion exchange functions or by reacting the polymeric material after polymerization to combine ion exchange functions into its polymeric matrix. It is contemplated that in most applications of materials prepared in accordance with this invention, they will be used in treating solution such as aqueous solutions, the solvent of which is not present in their gel structures during preparation. A feature of the process of this invention is the replacement of the gel solvent by other liquids, most commonly, water, in order to avoid contamination of the solutions to be treated by the gel solvent.

According to the process of this invention, monomeric or partially polymerized components of precursors of highly cross-linked electrically conductive ion permeable polymers are caused to polymerize while maintained in solutions in a suitable organic solvent under conditions preventive of substantial evaporation of the solvent and preferably in physical surroundings, such as casts or molds which predetermine the shape of the polymerized structures. Polymerization is effected by any of the well-known expedients, for instance, heat, pressure, and catalytic accelerators and is continued until an insoluble, infusible gel is formed substantially throughout the volume of solution. The active or potentially-active ion exchange groups may be fixed in one or more of the monomeric precursors or in the partially polymerized precursors; or the ion exchange groups may be included after polymerization is substantially complete as, for example, by sulfonation or quaternization. In any case, the polymerizing or polymerized structures should not be allowed to lose their solvent content as by evaporation or segregation.

Polymeric organic materials of both the addition and condensation type may be advantageously prepared by the process of this invention provided that there may be imparted to the material the requisite amount of cross-linking. For instance, addition-type polymers include copolymers of divinyl benzene or similar diolefinic compounds with any one or more of the following compounds: acrylic acid, methacrylic acid, acrylic esters, methacrylic esters, styrene, maleic anhydride, styrene para-sulfonate esters, styrene para-sulfonic acids, para-chloromethyl styrene, para-dialkylamino styrene, dialkyl para-vinyl benzylamine, trialkyl para-vinyl benzyl ammonium salts, N-alkyl vinyl pyridinium salts, acrylonitrile, vinyl acetate, vinyl chloride, allyl alcohol, vinylidine chloride, and similar polymerizable compounds. The divinyl benzene is included in these copolymerizations to provide for crosslinking across linear polymeric chains. Other diolefinic compounds which may be used for this same purpose include di-iso propenyl benzenes and diallyl ether. The dimethacrylate esters of ethylene glycol or tetraethylene glycol may also be used but since they are esters, they are not as resistant to water as divinyl benzene, and tend to hydrolyze upon prolonged contact with water.

Condensation type polymers may also be made according to the process of this invention and they include the condensation products of aldehydes with any of the following compounds: phenol and substituted phenols; dihydroxybenzenes, phloroglucinol; aniline and substituted anilines; metaphenylene diamine; melamine; urea; guanidine and guanidine derivatives; polyhydric phenols and polyalkylene polyamines; and ketones with amines.

In general the process of this invention may be applied to the formation of any highly crosslinked polymeric matrix, in which the desired dissociable ion exchange groups may be incorporated. Certain polymeric materials, however, are inherently unstable in water, such as polyester structures which tend to hydrolyze; but this limitation does not preclude the formation with them of crosslinked polymeric gels having active ion exchange groups.

It will be observed that although many of the polymers listed above inherently contain active ion exchange groups, many of them do not. The formation of selectively permeable, conductive structures with the latter type materials involves the step of incorporating ion exchange groups into the polymeric matrix as shown in the examples.

By maintaining dissolved or dispersed conditions throughout the polymerization, there results a solid solvated gel containing a continuous liquid (solvent) phase which retains the form of the dispersed liquid and which is furthermore a coherent and homogeneous structure. The presence of this continuous liquid phase makes it possible to treat the solid gel structure with reactants which combine active ion exchange groups with the polymeric material (that is, when it is necessary to implant ion exchange groups in polymeric structures which are not formed with such groups present).

It has been found that in order to attain the desirable electrochemical characteristics, the solvent of polymerization should be present during polymerization to the extent of at least 25 per cent by volume based on the weight of condensed solid, solvated material and generally should not at any time, either during polymerization or afterwards, be reduced unless replaced with another solvating liquor. Permitting the solvating-liquid content to become lower is likely to cause cracking of the structure or impairment of the electrical properties of the material. Although a minimum solvent content of 25 per cent has been found effective for the purpose of this invention, preferred embodiments include such larger amounts as do not interfere with the physical structure of the solid. Structures including as much as 75 per cent of solvent have been found satisfactory.

By maintaining dissolved or dispersed conditions during the polymerization, the structures of this invention polymerize throughout the volume of solution to form a polymeric matrix which entrains the solvent, thus resulting in a solvated gel structure which is particularly suitable for the purposes of this invention. The volume of the solvent present during the polymerization has been found to determine or fix the equilibrium liquid content of the polymerized structure. That is, the gel, after drying and reswelling in the same or a different solvent, imbibes substantially the same volume of liquid as was present during polymerization. This is particularly useful since it is often advantageous to carry out the introduction of the ion exchange groups (where this is required) in the presence of a solvent which is different from that used in polymerization. The gel does, however, shrink when liquid is removed from it, as by evaporation (regaining nearly the same volume on resolvating, however) which indicates that the polymeric matrix of the gel is not rigid but is rather of limited extensibility.

Ordinary curing conditions in which the solvent is not present or in which it is allowed to escape or evaporate, do not result in the formation of continuous, coherent, or homogeneous structures which are appreciably selectively permeable and electrically conductive. Either a continuous resinous, dielectric results as is typified by the well known acrylate, styrene, melamine or phenolic molding resins, or a fractured or particulate structure results which is typified by the granular ion exchange resins, for example, those described in U. S. Patents 2,195,196; 2,340,110; 2,340,111; 2,106,486; 2,198,874; and 2,228,514.

The products produced in accordance with this invention when converted to the aqueous form have been found to have high electrical conductivities generally in excess of $5 \times 10^{-3}$ ohm$^{-1}$ cm.$^{-1}$. They are substantially selectively permeable to ions of one sign or the other as indicated by the fact that in the standard concentration cell:

| calomel electrode | sat'd KCl bridge | 0.1 N KCl | membrane | 0.01 N KCl | sat'd KCl bridge | calomel electrode |
| --- | --- | --- | --- | --- | --- | --- |
|  |  |  |  |  |  |  | at 25° C., a characteristic concentration potential approaching an absolute value of 55.1 millivolts may be measured. The ion exchange capacity of these materials is desirably in excess of 0.3 milliequivalent per gram of solid material after correction has been made for the solvent content and for reinforcing material if present. They possess hydraulic resistivities in excess of 100 atm. sec. cm.$^{-2}$ (the pressure in atmospheres required to cause liquid to permeate a centimeter cube of the material at the rate of 1 cubic centimeter per second).

Structures may be formed in accordance with this invention by casting or molding (including compression molding) the solution of polymerizable components or partially polymerized components and causing polymerization in the molds or casts, as by heating, while preventing the evaporation or escape of substantial amounts of solvent (for instance, by closing the molds or otherwise carrying out the polymerization under substantially saturated solvent conditions). In this way, forms and structures may be prepared in any desired shape and size, including structures having at least 1 dimension greater than ¼ inch, and which are accordingly far greater in size than structures in which conventional ion exchange materials have been made in the past. Reinforcing materials which do not interfere with the polymerization such as glass cloth, paper, or the like, may be included in the molds or casts. On the other hand, the reinforcing material may be impregnated with the unpolymerized or partially polymerized solution and polymerization subsequently carried out under conditions which prevent the escape or segregation of solvent.

The selection of a suitable solvent in which any particular polymerization may be effected, will, of course depend in part on the nature of the polymerizable ingredients—for the liquid must be capable of forming a solution or dispersion with them—and upon the effects of the solvent on the polymerization reaction which should be neither accelerated to too rapid a rate nor inhibited to too slow a rate by the solvent. Furthermore, since the solvent content must be maintained during polymerization, the solvent must not enter into the polymerization reaction lest it be converted to resinous structures and cease to exist as a liquid phase. In general, satisfactory results may be obtained with such solvents as the lower aliphatic alcohols; the saturated ethers, including dioxane; saturated halogenated aliphatic liquids, such as acetone; and liquid aromatic hydrocarbons such as toluene; except that polymerizations which proceed according to the free radical mechanism should not be carried out in the presence of phenols.

The rate of polymerization depends, in part, upon the concentration and nature of the solvent and catalysts present, and upon the temperature of the polymerization, and should be so controlled by methods well known to the art as to allow convenient casting of the polymerizable solution and to prevent undue temperature increases which may result in the escape of solvent vapor bubbles by the heat of polymerization. Suitable proportions of catalysts and conditions of polymerization in particular applications are illustrated in the examples. In general, best results are obtained when the nature and concentration of catalysts and the temperature are such as to require at least one hour for the completion of polymerization.

If desired, the mixture of polymerizable ingredients may be partially prepolymerized before casting. This results in an increase in the viscosity of the solution and may be desirable in some cases to facilitate casting.

After polymerization, it is generally desirable to convert the solid polymeric gel structure to the hydrous gel form. If the solvent of polymerization is water-miscible, the gel need only be leached repeatedly in water until the solvent is extracted and replaced by water. If the solvent is not water-miscible, it may be conditioned for water by first leaching the gel in a solvating liquid which is mutually miscible with both water and the solvent, thus to convert the gel to a water-miscible-liquid form. Inasmuch as the solid structure of this invention are contemplated as having the greatest utility in the hydrous gel form, it is generally preferable to select a water-miscible solvent for the polymerization if this is possible.

It has also been found that it is frequently possible to replace a water-immiscible liquid in the gel with water simply by immersing the gel in water. It appears that the affinity of the ion exchange groups for water is sufficiently great to cause the water to displace the water-immiscible-liquid from the gel.

It is apparent from the foregoing that this invention provides a process of preparing a solvated gel having a polymeric solid phase. Selective permeability and electrical conductivity are imparted to the gel structure by providing ionic constituents such as are present in ion exchange resins, in the polymeric matrix. These constituents include any ionizible group, one component of which upon dissociation is incorporated into the polymeric matrix while the other consists of a mobile active ion. For example, a cation-permeable structure includes negative ions such as carboxylic or sulfonic, in the polymeric matrix, with mobile cations such as hydrogen, sodium, and the like associated therewith. An anion permeable structure, on the other hand, includes positive ions such as primary, secondary, or tertiary amino groups or quaternary ammonium groups in the polymeric matrix, with mobile anions, such as hydroxyl, chloride, and the like associated with them. These ionic groups are noted to have dissociation constants over $10^{-5}$.

It has been found that there should not be more than 4 milliequivalents of ion exchange groups incorporated in the polymerized structure for each mol of crosslinking agent and not less than 1 equivalent of ion exchange groups for each 10 mols of monomeric constituents.

The ionic groups may be present in the polymerizable ingredients from which polymeric gels are made, as in the case of the polymerization of formaldehyde and phenol sulfonic acid, or formaldehyde, resorcinol, and a polyalkylene polyamine. Alternatively, the ionic groups may be incorporated in the polymeric matrix after the gel is formed. For instance, a copolymer of divinyl benzene and styrene may be formed which is thereafter sulfonated to incorporate sulfonic acid groups. Or vinyl pyridine and divinyl benzene may be copolymerized (to form a structure which has the ion exchange properties of a weakly basic anion exchange resin) and thereafter quaternized to the quaternary ammonium form by treatment with dimethyl sulfate.

If the ionic groups are to be incorporated in the polymeric matrix after polymerization and the formation of the solid gel structure, it is desirable that the solvating-liquid content of the solid structure be not reduced during the treatment; the same precautions against the net escape of solvent should be followed then as during the polymerization, least fracturing and/or impairment of the electrical and mechanical properties result. Thus reagents used to treat the solid gel should either comprise or be dissolved in a suitable liquid, so that they do not extract liquid from the gel without replacement thereof, and evaporation of liquid from the gel must also be prevented. An organic solvating liquid may be removed from the gel provided it is simultaneously replaced by a second liquid. This solvent substitution may be accomplished by leaching in the second solvent. Preferably the solvents to be interchanged are miscible; but if they are not one may first leach the structures in a solvent miscible with both liquids.

Solvent substitution is often advantageous particularly if the ion exchange groups are to be introduced after polymerization, for example, by the sulfonation of polymerizates of divinyl benzene and styrene. Solvent substitution permits the use of one solvent particularly suitable for the polymerization and of a second solvent which is well suited for the introduction of the active exchange groups. On the other hand, the reagent active in the introduction of exchange groups may be dissolved in a solvating liquid which is different from the one which solvates the gel. On the other hand, the active reagent may itself be a suitable solvating liquid.

It is found that a product having improved mechanical properties is often obtained if the polymerized structure is leached in a solvating organic liquid. This leaching apparently removes unpolymerized and low molecular weight constituents and is of greatest value when the exchange groups are added or formed after polymerization.

It has been found that the permissible ratio of equivalents of ion exchange groups per mol of crosslinking agent may be increased to as much as 6.0 or alternatively the amount of crosslinking may be decreased to as little as 20 mol per cent of the total polymerizable material provided a suitable structural reinforcing medium is used. This medium should have a tear strength of at least 50 grams for each millimeter of thickness, a void volume of at least 50 per cent, and should have about as good chemical and heat resistance as the polymer. Generally, it is found that the reinforcing material should constitute at least 5 per cent but not more than 50 per cent by weight of the solvated structure. If less than 5 per cent is used there will be no appreciable increase in tear resistance and if more than 50 per cent is used, the desirable electrochemical properties will be seriously reduced.

Materials which are suitable for reinforcing the structures of this invention are glass filter cloth (such as National Filter Media Company's G-210), polyvinylidene chloride screen (such as Chicopee Manufacturing Company's 15 x 18 "Lumite" screen), glass paper (such as Naval Research Laboratory's Type AAA manufactured by Glass Fibers, Incorporated), treated cellulose battery paper (such as that manufactured by Dewey and Almy Chemical Company), polystyrene-coated glass fiber mat (such as that manufactured by Owens-Corning Fiberglas Corporation), and polyvinyl chloride battery paper (such as Electric Storage Battery Company's "Pormax") and the like.

The following examples have been selected for purposes of illustration and are not presented to suggest limitations not previously described and not included in the appended claims.

*Example 1.—Copolymer of divinyl benzene and maleic anhydride*

In 200 cc. of peroxide free dioxane were dissolved 98 gram (1 mol) of maleic anhydride and 108 cc. of inhibitor-free 40–50 per cent divinyl benzene of commerce (by actual analysis containing 44 mol per cent of divinyl benzene). About 0.2 gram of 2-azo-bis(isobutyronitrile) were added and the mixture was cast between two glass plates on a reinforcing material of glass cloth. The casts were heated at 65° C. for twenty hours under non-evaporative conditions. After cooling, the polymer was leached with water and then boiled briefly in 1 N hydrochloric acid, in order to hydrolyze the anhydride groups. The resulting membranes were then equilibrated with 1 N sodium hydroxide and then thoroughly leached until the wash waters reached a constant pH (about 10). The electrochemical properties are listed in Table I.

*Example 2.—Sulfonated copolymer of divinyl benzene and styrene*

A solution was prepared containing 50 parts by weight of 50–60 per cent divinyl benzene of commerce (containing by actual analysis 53 mol per cent of divinyl benzene and about 40 mol per cent ethyl vinyl benzene) and 50 parts by weight of toluene and 0.3 part of benzoyl peroxide. The mixture was cast between two glass plates on a reinforcing material of glass cloth. The casts were heated at 80° C. for three hours under non-evaporative conditions. The casts were then cooled to room temperature, leached in ethylene chloride, and plunged into 96.5 per cent sulfuric acid containing 0.1 per cent silver oxide. The polymerized structures were heated in the sulfuric acid at 90° C. for fifteen hours. After cooling, the sulfonated polymer was leached with water and subsequently equilibrated with 1 N sodium chloride solution. The structures were then leached with water until free of chloride. The electrochemical properties are listed in Table I.

*Example 3.—Polymers of resorcinol, phenol, sulfuric acid, and paraformaldehyde*

A 55 part by weight portion of resorcinol and 47 parts of phenol were melted together at a temperature of 100° C. and then cooled to 60° C. at which time 103 parts of 96 per cent sulfuric acid were added. The temperature was raised by this addition to 105° C. Over the course of twenty minutes, the sulfonated mixture was allowed to cool to 30° C. and 40 parts of methanol were added. A solution of 50 parts of paraformaldehyde in 100 parts of methanol was cooled to a temperature of —10° C. The sulfonate solution was added to the cold paraformaldehyde solution with stirring. The addition was done slowly over the course of 30 minutes while maintaining the temperature between 0° C. and —5° C. The resulting liquid was cast between two glass plates on a reinforcing material of glass cloth. It was then cured at 60° C. for thirty hours under non-evaporative conditions. After curing, the casts were leached in distilled water and subsequently equilibrated with 4 N sodium chloride solution, and again leached with distilled water. The electrochemical properties are listed in Table I. The reinforcing material was identical to that described in Example 1.

Similar results were obtained in the range of 0.8 to 1.2 mols of sulfuric acid per total number of mols of resorcinol and phenol and 1.3 to 2.0 mols of paraformaldehyde (calculated on the basis of available formaldehyde), and 0 to 9 mols of resorcinol per mol of phenol.

*Example 4.—Polymer of resorcinol, diethylene triamine and paraformaldehyde*

A solution of 55 parts of paraformaldehyde in 110 parts of methanol was added to 51.5 parts of diethylene triamine—boiling range, 200–204° C.—dissolved in 74 parts of methanol. The mixture was cooled to 5° C. and 55 parts of resorcinol in solid form were stirred into the mixture. The temperature was allowed to rise slowly to dissolve the resorcinol. When the resorcinol was dissolved, the liquid was cast between two glass plates on a reinforcing material of glass cloth. The casts were then cured at 60° C. for thirty hours under non-evaporative conditions. The resulting membranes were leached with distilled water, equilibrated with 1 N hydrochloric acid and then leached with distilled water to a pH of 3.5. The electrochemical properties are listed in Table I.

*Example 5.—Polymer of quaternized 2-vinyl pyridine and divinyl benzene*

To 36 cc. of 2-vinyl pyridine (0.34 mol) containing 0.1 per cent hydroquinone, dissolved in 40 cc. of iso-propanol and warmed to 55° C. was added 36 cc. dimethyl sulfate (0.36 mol) at a rate such that the temperature did not exceed 65°. About ten minutes were required and the reaction mixture was occasionally cooled. The mobile solution was then cooled to room temperature.

To this solution was added 27 cc. of divinyl benzene (which contained by actual analysis 76 mol per cent of divinyl benzene in a solution of ethyl vinyl benzene). The resulting mixture was then cast between two glass plates on reinforcing material of glass cloth. Care was taken to prevent the inclusion of bubbles. The casts were heated at 80° C. for three hours, cooled to room temperature and then leached with methanol, washed with water, equilibrated with 1 N sodium chloride solution and then thoroughly leached with water. The properties of the resulting structure are given in Table I.

*Example 6.—Quaternized copolymers of 2-vinyl pyridine and divinyl benzene*

A mixture of 108 cc. of freshly distilled 2-vinyl pyridine, 80 cc. of 76 mol per cent divinyl benzene, and 125 cc. of toluene to which had been added 0.6 gram of 2-azo-bis-(isobutyronitrile) was cast on a backing of glass cloth between two glass plates. The cast was baked at 80° C. for three hours, then cooled.

The cast was then leached in absolute ethanol until equilibrium was reached, and was then heated at 60° C. for twenty hours in a mixture of 25 parts by volume of dimethyl sulfate and 10 parts of absolute ethanol. After this treatment, whereby the N-alkyl quaternary ammonium salt of the pyridine constituent was formed, the cast membrane was washed with water and then converted to the chloride form in a sodium chloride solution. The properties are given in Table I.

In the examples, the polymerizations were carried out between two glass plates. The plates were approximately 20 cm. by 20 cm. and were spaced about 1 mm. apart. It has been found that under the conditions of the examples, substantially no evaporation takes place through the restricted aperture between the plates so that only the outermost edges of the polymerized structures lose solvent during the course of the polymerization. The partially dried edges appear to prevent further evaporation of solvent. After polymerization is complete, the edges are trimmed off. In some cases, it is desirable to use sealed molds to prevent the evaporation of solvent.

It will be observed from the examples that a wide range of polymerization reactions may be carried out in the presence of a solvent for the preparation of solid gel structures, and that the ion exchange groups may be inherent in the polymerizable material or may be imparted to the gel structure by appropriate chemical treatment. Example 1 demonstrates a typical addition-type polymerization resulting in a highly crosslinked polymeric structure containing dibasic acid anhydride groups. Ion exchange groups were formed in this polymeric structure by hydrolysis of the anhydride groups thereby to form carboxylic groups, and the simultaneous replacement of the solvent dioxane with water then occurred.

Example 2 demonstrates another addition-type polymerization resulting in a highly crosslinked polymeric structure. Ion exchange groups were formed in the polymeric structure by sulfonating it in sulfuric acid. Before sulfonation, the solvent of polymerzation, toluene, was replaced by ethylene dichloride which was subsequently replaced by water. Example 2 thus also illustrates the use of solvent substitution. The product sulfonated in this way has improved electrochemical and mechanical properties.

Example 3 demonstrates a typical condensation polymerization of monomeric materials, one of which contains the sulfonic acid ion exchange group. The solvent, methanol, was replaced by water after the membranes were formed.

Example 4 demonstrates another condensation polymerization of monomeric materials containing amino ion exchange groups to form an anion exchange structure. Here again, the solvent, methanol, was later replaced by water.

Example 5 demonstrates the formation of an anion exchange structure by an addition-type polymerization, wherein the ion exchange groups were formed on one of the monomeric precursors, 2-vinyl pyridine, by the formation therefrom of the quaternary ammonium salt. After polymerization, the solvent, iso-propanol, was replaced by water.

Example 6 is similar to Example 5 except that in Example 6 the polymer was formed first, and the ion exchange groups were incorporated by the reaction of the polymeric material to form quaternary ammonium groups in it. In this example, the solvent, toluene, was first replaced by ethanol, and subsequently the membrane was treated in an ethanol solution of dimethyl sulfate to form the quaternary ammonium salt of the vinyl pyridine groups. The ethanol of the quaternized polymeric structure was thereafter replaced with water.

The solvents in which the polymerization of the reactions were carried out are typical solvents for the precursor polymerizable materials.

TABLE I

| Example | Type | Moisture, percent | Cap., meq./gram | Conc. E. M. F. | Cond., ohm$^{-1}$ cm.$^{-1}$×10$^{-3}$ |
|---|---|---|---|---|---|
| 1 | Cation (weak) | 41 | 2.1 | 10 | 6 |
| 2 | Cation | 50 | 2.9 | 11 | 6 |
| 3 | do | 55 | 2.1 | 10 | 7 |
| 4 | Anion (weak) | 62 | 4.5 | 14 | 11 |
| 5 | Anion | 50 | 4.2 | 13 | 10 |
| 6 | do | 39 | 1.6 | 12 | 5 |

The physical characteristics of the membranes produced in the above examples are set forth in Table I. The moisture content was obtained by drying specimens as prepared according to the examples, to constant weight at 105° C. and expressing the loss of weight as per cent of the weight of the aqueous material after correction had been made for the weight, if any, of the reinforcing material.

The ion exchange capacity of the structures of Example 1 was determined by bringing a specimen into equilibrium with 1 N sodium hydroxide solution and then leaching repeatedly in distilled water to remove absorbed sodium hydroxide until the leached water attained a comparatively stable pH (about 10). The specimen in this condition was then put in ten times its weight of distilled water and titrated with 0.1 N hydrochloric acid to an equilibrium pH of 5. The capacity is expressed as the number of milliequivalents of hydrogen used in the titration per 105° C. dried gram of material in the hydrogen form after correction had been made for the weight, if any, of reinforcing material. The ion exchange capacities of the structures of Examples 2 and 3 were determined by bringing specimens into equilibrium with 4 N hydrochloric acid solution, then leaching repeatedly in distilled water to remove absorbed hydrochloric acid, and finally removing all hydrogen by soaking the structures repeatedly in 4 N sodium chloride solution until equilibrium was reached and titrating the sodium chloride solution for liberated hydrogen. The capacity is expressed as the number of milliequivalents of hydrogen removed by the sodium chloride per 105° C. dried gram of material in the hydrogen form after correction had been made for the weight, if any, of the reinforcing material.

The ion exchange capacities of the structures in Examples 4, 5, and 6 were determined by bringing specimens into equilibrium with a 4 N sodium chloride solution, then leaching repeatedly in distilled water to remove adsorbed sodium chloride and finally removing all chloride by soaking the specimens repeatedly in 4 N sodium nitrate solution until equilibrium is reached and titrating the solution for chloride. The capacity is expressed as the number of milliequivalents of chloride removed by the nitrate per 105° C. dried gram of material in the chloride form after correction had been made for the weight, if any, of the reinforcing material.

The concentration potential was measured in concentration cells with specimens separating a 0.60 N aqueous sodium chloride and a 0.30 N aqueous sodium chloride solution. The electrodes were saturated calomel electrodes connected to the sodium chloride solutions by means of saturated potassium chloride salt bridges. The specimens as prepared in the examples were brought into equilibrium with 0.60 N aqueous sodium chloride solution prior to insertion in the cell. The respective solutions in the cell were continuously renewed to maintain the solution. The values recorded in Table I are the absolute values of the open circuit potential after steady conditions were attained. In such a cell, the absolute value of the thermodynamically ideal potential is 17 millivolts. It will be seen from Table I that this standard was consistently approached.

The electrical conductivity was measured by forming from a specimen as prepared according to the examples, a strip 10 cm. long, 1 cm. wide and 0.1 cm. thick, clamping the ends to copper electrodes and measuring the resistance to 60 cycle alternating current. The conductivity is the reciprocal of the resistivity, and is expressed in millimhos in Table I. The conductivity of cation structures was measured on structures in the sodium form; for anion structures, the conductivity is of the chloride form.

It will be understood that the term solvent in this specification and the appended claims refers to the solubility of the precursor polymerizable material, and not to the cured crosslinked polymers formed therefrom, since they are desirably insoluble. Similarly the term solvating liquid refers to liquid which, like solvents, will enter the polymeric structure and solvate it.

Having thus disclosed my invention, I claim as new and desire to secure by Letters Patent:

1. In the method of forming a solid electrolytically conductive, selectively permeable, unfractured ion exchange membrane having at least two dimensions in excess of 0.25 inches and comprising an insoluble infusible synthetic organic solid polymeric structure, dissociable ionic groups having a dissociation constant of at least $10^{-5}$ and being present in an amount of at least 0.3 milliequivalents per gram of solid material chemically bonded to said structure, and a solvent in gel relationship with said structure, the steps of (1) forming a dispersion in an organic solvent of material capable of polymerizing into said solid polymeric structure, (2) casting said dispersion on a reinforcing material to a membrane form having at least two dimensions in excess of 0.25 inches, (3) curing said dispersion to the insoluble infusible state in the presence of said organic solvent under conditions substantially preventive of the escape of said solvent thereby forming said solid polymeric structure and (4) thereafter maintaining the solvent content of said structure.

2. The method of claim 1 wherein the polymeric structure is a condensation product.

3. The method of claim 1 wherein the polymeric structure is an addition product.

4. The method of claim 1 wherein the organic solvent is present to the extent of at least 25% but not more than 75% by weight, and wherein said dissociable ion exchange groups are of the class consisting of carboxylic, sulfonic, quaternary amine, and alkylene amine.

5. The method of claim 1 wherein the polymeric structure is a condensation product, the organic solvent is present to the extent of at least 25% but not more than 75% by weight and wherein said dissociable ion exchange groups are of the class consisting of carboxylic, sulfonic, quaternary amine, and alkylene amine.

6. The method of claim 1 wherein the polymeric structure is an addition product, the organic solvent is present to the extent of at least 25% but not more than 75% by weight and wherein said dissociable ion exchange groups are of the class consisting of carboxylic, sulfonic, quaternary amine, and alkylene amine.

7. In the method of forming a solid electrolytically conductive, selectively permeable, unfractured ion exchange membrane having at least two dimensions in excess of 0.25 inches and comprising an insoluble infusible synthetic organic solid polymeric structure, dissociable ionic groups selected from the class consisting of carboxylic, sulfonic, quaternary amine, and alkylene amine, and being present in an amount of at least 0.3 millequivalents per gram of solid material chemically bonded to said structure, and a solvent in gel relationship with said structure, the steps of (1) forming a dispersion in an organic solvent of material containing said dissociable ionic groups and capable of polymerizing into said polymeric structure (2) casting said dispersion on a reinforcing material to a membrane form having at least two dimensions in excess of 0.25 inches and (3) curing said dispersion to the insoluble infusible state in the presence of an organic solvent under conditions substantially preventive of escape of said solvent, thereby forming said solid polymeric structure as a membrane containing said dissociable ionic groups.

8. The method of forming a solid electrolytically conductive, selectively permeable, unfractured ion exchange membrane having at least two dimensions in excess of 0.25 inches and comprising an insoluble infusible synthetic organic solid polymeric structure, dissociable ionic groups therein, and a solvent in gel relationship with said structure, the steps of (1) forming a dispersion in an organic solvent of material capable of polymerizing into said solid polymeric structure, the organic solvent being present to the extent of at least 25% but not more than 75% by weight, (2) casting said dispersion on a reinforcing material to a membrane form having at least two dimensions in excess of 0.25 inches, (3) curing said dispersion to the insoluble infusible state in the presence of said organic solvent under conditions substantially preventive of the escape of said solvent thereby forming said polymeric structure, and (4) reacting the polymeric structure with an agent capable of introducing dissociable ionic groups of the class consisting of carboxylic, sulfonic, quaternary amine, and alkylene amine, under conditions substantially preventive of the loss of solvent content.

9. The method of forming a solid electrolytically conductive, selectively permeable, unfractured ion exchange membrane having at least two dimensions in excess of 0.25 inches and comprising an insolube infusible synthetic organic solid condensation polymeric structure, dissociable ionic groups therein, and a solvent in gel relationship with said structure, the steps of (1) forming a dispersion in an organic solvent of material capable of polymerizing into said solid condensation polymeric structure, the organic solvent being present to the extent of at least 25% but not more than 75% by weight, (2) casting said dispersion on a reinforcing material to a membrane form having at least two dimensions in excess of 0.25 inches, (3) curing said dispersion to the insoluble infusible state in the presence of said organic solvent under conditions substantially preventive of the escape of said solvent thereby forming said condensation polymeric structure, and (4) reacting the condensation polymeric structure with an agent capable of introducing dissociable ionic groups of the class consisting of carboxylic, sulfonic, quaternary amine, and alkylene amine, under conditions substantially preventive of the loss of solvent content.

10. The method of forming a solid electrolytically conductive, selectively permeable, unfractured ion exchange membrane having at least two dimensions in excess of 0.25 inches and comprising an insoluble infusible synthetic organic solid polymeric structure, dissociable ionic groups therein, and a solvent in gel relationship with said structure, the steps of (1) forming a dispersion in an organic solvent of material capable of polymerizing into said solid polymeric structure, (2) casting said dispersion on a reinforcing material to a membrane form having at least two dimensions in excess of 0.25 inches, (3) curing said dispersion to the insoluble infusible state in the presence of said organic solvent under conditions substantially preventive of the escape of said solvent thereby forming said structure, and (4) reacting the polymeric structure with an agent capable of introducing dissociable ionic groups of the class consisting of carboxylic, sulfonic, quaternary amine, and alkylene amine, under conditions substantially preventive of the loss of solvent content.

11. The method of forming a solid electrolytically conductive, selectively permeable, unfractured ion exchange membrane having at least two dimensions in excess of 0.25 inches and comprising an insoluble infusible synthetic organic solid polymeric structure, dissociable ionic groups therein, and a solvent in gel relationship with said structure, the steps of (1) forming a dispersion in an organic solvent of material capable of polymerizing into said solid polymeric structure, (2) casting said dispersion to a membrane form having at least two dimensions in excess of 0.25 inches, (3) curing said dispersion to the insoluble infusible state in the presence of said organic solvent under conditions substantially preventive of the escape of said solvent thereby forming said polymeric structure, and (4) reacting the polymeric structure with an agent capable of introducing dissociable ionic groups of the class consisting of carboxylic, sulfonic, quaternary amine, and alkylene amine, under conditions substantially preventive of the loss of solvent content.

References Cited in the file of this patent

UNITED STATES PATENTS

| | | |
|---|---|---|
| 2,223,930 | Griessback | Dec. 3, 1940 |
| 2,405,817 | D'Alelio | Aug. 13, 1946 |
| 2,408,615 | Dudley | Oct. 1, 1946 |
| 2,409,861 | Hunter | Oct. 22, 1946 |

(Other references on following page)

UNITED STATES PATENTS

| | | | |
|---|---|---|---|
| 2,500,149 | Boyer | Mar. 14, | 1950 |
| 2,540,984 | Jackson | Feb. 6, | 1951 |
| 2,565,147 | Pfluger | Aug. 21, | 1951 |
| 2,593,540 | Cornwell | Apr. 22, | 1952 |
| 2,636,851 | Juda | Apr. 28, | 1953 |

OTHER REFERENCES

Kunin: Ion Exchange Resins, page 62, John Wiley and Sons Inc., New York (1950).

Chemical and Eng. News, volume 29, No. 8, February 1951, page 693.